June 25, 1968     D. W. ROGERS     3,390,322
PHASE CONTROLLED INVERTER
Filed Aug. 20, 1965     2 Sheets-Sheet 1
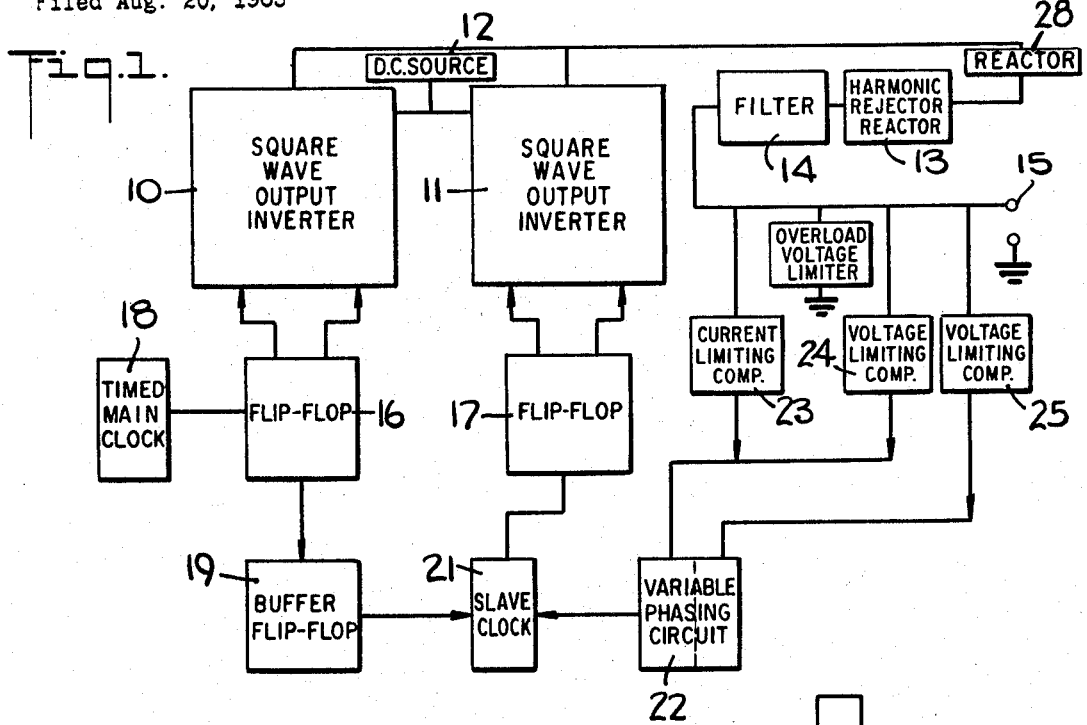
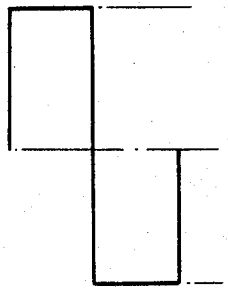
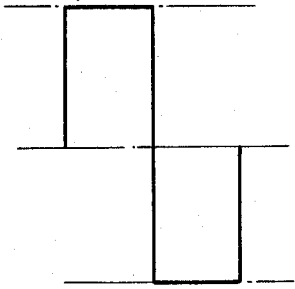
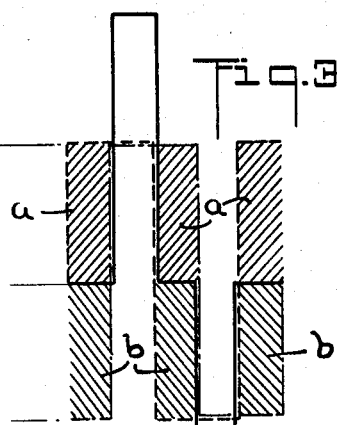
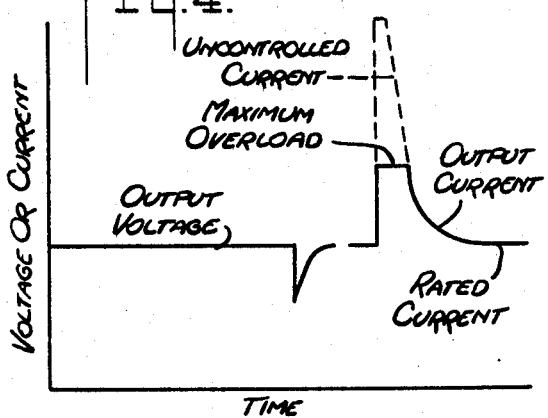
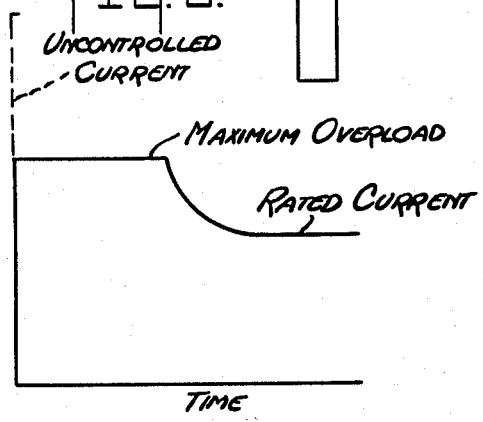

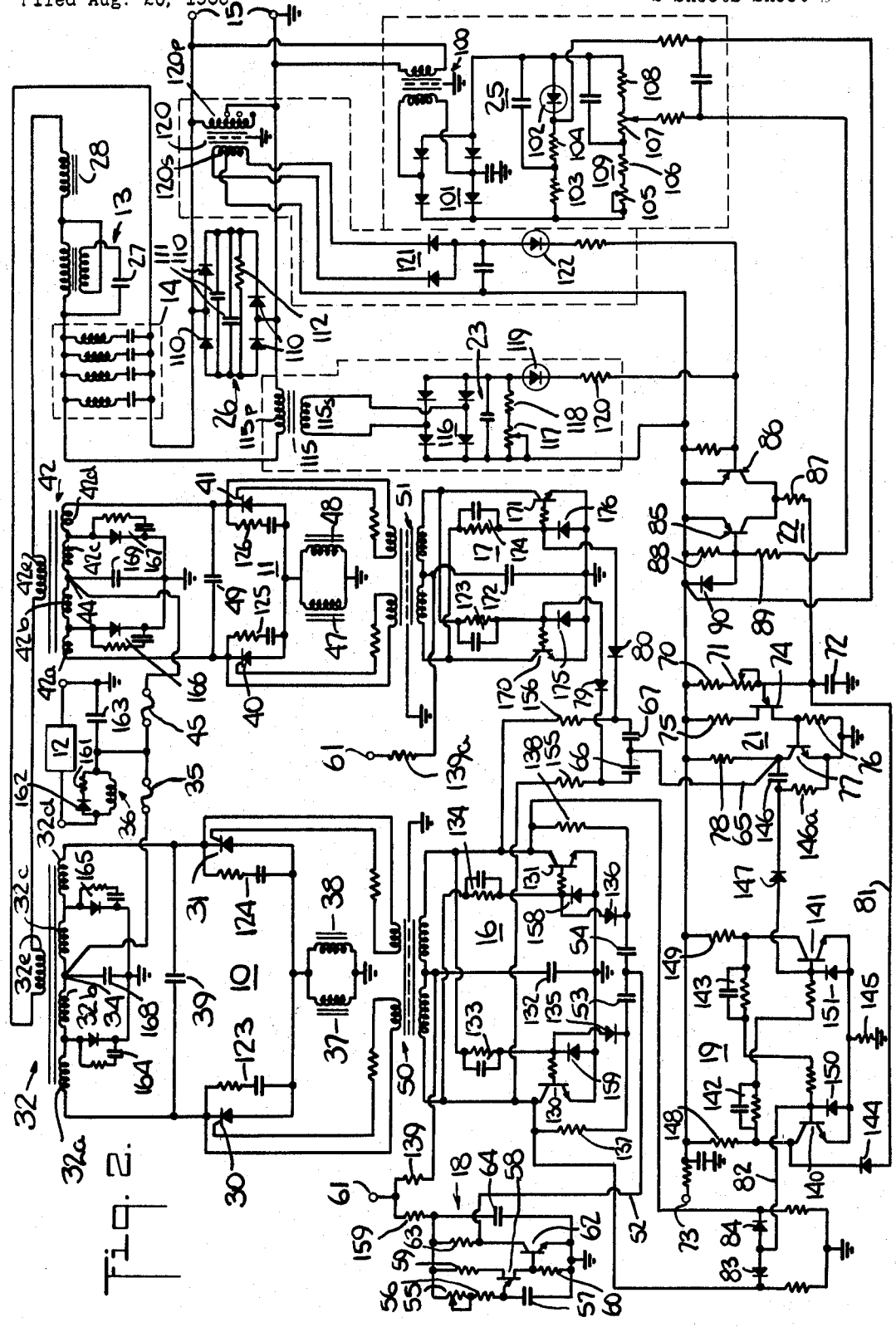

United States Patent Office 3,390,322
Patented June 25, 1968

3,390,322
PHASE CONTROLLED INVERTER
David W. Rogers, Teaneck, N.J., assignor to Regulators Inc., Wyckoff, N.J., a corporation of New Jersey
Filed Aug. 20, 1965, Ser. No. 481,301
6 Claims. (Cl. 321—18)

ABSTRACT OF THE DISCLOSURE

An inverter for changing direct current to alternating current has two square wave output inverters connected to output transformers having the secondary windings connected in parallel. The inverters are switched by separate flip-flop circuits with one flip-flop timed by a main clock circuit and the other inverter timed by a slave clock circuit. The phasing of the slave clock circuit is varied in relation to the main clock circuit by a variable phasing circuit. The variable phasing circuit is connected to current and voltage limiting and control circuits to control the output of the inverter.

This invention relates to electrical inverters for changing the direct voltage and current to an alternating voltage and current.

An object of the invention is to provide a static inverter for driving alternating current motors and equipment from a direct current source at a high system efficiency.

Another object of the invention is to provide a static inverter for providing power to alternating equipment that is competitive in cost of manufacture.

Another object of the invention is to provide a static inverter that maintains the output voltage at a given value over wide variation in load.

Another object of the invention is to provide a static inverter having an output with a substantially constant frequency.

Other and further objects and advantages will be apparent from the following description and the drawings in which FIG. 1 is a block diagram of the components;

FIG. 2 is a detailed circuit diagram of the components of the inverter;

FIGS. 3a to 3c illustrate the voltage output of the inverters;

FIG. 4 illustrates transient conditions of the output voltage during operation; and FIG. 5 illustrates the output voltage when the inverter is started with a short in the load.

Referring to the block diagram of FIG. 1 in describing the inverter apparatus, two identical solid state controlled inverters 10 and 11 are connected to a direct voltage source 12 and have outputs connected in series with a harmonic rejector reactor 13 and a condenser 27. Reactor 13 is connected to a filter 14 for shaping the voltage and current supplied to the output 15. Reactor 28 limits the harmonic currents drawn by the filter 14 and limits the overload currents. The inverters 10 and 11 are controlled by the flip-flop components 16 and 17 connected to a respective inverter. The output voltages of the inverters have a square wave shape and are varied in phase relation by varying the time of operation of the flip-flop component 17 in relation to the flip-flop component 16. The flip-flop component 16 is altered from one condition to the other by a timed main clock 18 providing pulses at precisely controlled time intervals. The signal supplied by the flip-flop component 17 to the inverter 11 is controlled by the buffer flip-flop circuit 19 and a slave clock or phase control circuit 21. A variable phasing circuit 22 is connected to the slave clock 21 to vary the timing of the signal provided by the slave clock 21 to the flip-flop component 17 for adjusting the phase relation between the square wave outputs of the inverters 10 and 11.

A current limiting component 23 and a voltage limiting component 24 are connected between the output 15 and the variable phasing circuit 22 to provide a signal to decrease the phase overlap of the square wave outputs of the inverters 10 and 11. A voltage control circuit 25 is connected between the output 15 and the variable phasing circuit 22 to vary the phase relation of the outputs of the inverters 10 and 11 to maintain the output 15 at a given value. An overvoltage limiter 26 is connected to the output 15 to absorb over a few cycles excessive overload currents for protection of the inverter apparatus.

In FIGS. 3a and 3b the square wave outputs of the inverters 10 and 11 respectively are illustrated. The outputs are connected in a series additive relation so that the voltages of the two square waves are added together to produce a voltage having twice the value, as illustrated in FIG. 3c. The output voltages overlap a fraction of each half cycle in an additive relation. In the other portions of the half cycles, the shaded portions *a* of the inverter 11 and the shaded portions *b* of the inverter 10 cancel one another, thus limiting the amount of power delivered by the combined outputs to a value less than the power of in phase voltages. Thus the output phases may be varied in relation to one another for adjusting the output voltage level to load and circuit demands.

Considering the components in greater detail as illustrated in FIG. 2, the solid state controlled inverter 10 has two silicon controlled rectifiers 30 and 31 as the solid state controlled devices. These silicon controlled recifiers 30, 31 are connected in parallel to the direct voltage source 12 through the primary windings 32a and 32b of the output transformer 32 for the rectifier 30 and primary windings 32c and 32d for the rectifier 31. The center tap 34 between the windings 32b and 32c is connected to the direct voltage source 12 through the fuse 35 and the inductance 36. The rectifiers 30 and 31 are connected to ground through the reactor windings 37, 38 connected in parallel.

With the rectifiers 30 and 31 connected in the same direction and parallel to a direct current source, means must be provided to block the current of one rectifier while the other rectifier is conducting. This is accomplished by the capacitor 39 connected between the silicon controlled rectifiers 30 and 31 and connected in parallel with the primary windings 32a through 32d.

Considering the operation of the inverter 10 with both rectifiers off, rectifier 30 may be fired by a suitable pulse to render it conductive. While it is conducting a charge develops on the capacitor 39 opposite to the polarity of the voltage across the rectifier 30. The capacitor 39 provides an alternate path to the voltage source through the primary windings 32c and 32d. Conduction to ground is blocked by the non-conducting rectifier 31.

The charge on capacitor 39 prevents instantaneous changes in voltages of the cathodes of the controlled rectifiers when the main current is changing from one controlled rectifier to the other. On application of a timed firing pulse from the flip-flop component 16 to the controlled rectifier 31, the rectifier 31 changes to the conductive state. Since the cathode potential of controlled rectifier 31 is below ground approximately twice the supply voltage and cannot change in the instant the rectifier is altered to the conductive state, the anode potential of the rectifier 31 will also be below ground at approximately twice the supply voltage. The anode of rectifier 31 is connected to the ungrounded side of the reactor windings 37 and 38 and to the anode of the controlled rectifier 30. The potential of the ungrounded side of the reactor windings and of the anode of rectifier 30 is now below ground approximately twice the supply voltage. Thus rectifier 30 will have a reverse potential impressed thereon which will render the rectifier non-conductive. The reactor windings 37, 38 allow very rapid changes in voltage at the anodes of the controlled rectifiers to render the rectifiers non-conductive.

The inverter 11 operates in a corresponding manner and has silicon controlled rectifiers 40 and 41 connected in parallel to the voltage source 12 through the primary windings 42a and 42b, and 42c and 42d. The center tap 44 between the windings 42b and 42c is connected to the voltage source through the fuse 45 and inductor 36. The capacitor 49 is connected across the rectifiers 40, 41 and the reactor windings 47 and 48 are connected in series therewith to amplify the discharge pulse for applying a reverse voltage to the conducting silicon controlled rectifier. The output secondary windings 32e and 42e are connected in series so that the voltages therein are additive.

Firing pulses are provided to the silicon controlled rectifiers 30 and 31 through the transformer 50 and firing pulses are provided to the silicon controlled rectifiers 40 and 41 through the transformer 51. The transformer 50 is connected to a conventional transistor flip-flop component 16 and the transformer 51 is connected to a conventional flip-flop component 17. These components have two states of stability and require an outside excitation to shift from one state to the other. A main timing means or clock 18 is provided conneced by line 52 to the flip-flop component 16 through the condenser 53 for setting one half of the flip-flop component and condenser 54 for setting the other half. The clock 18 comprises a resistance capacitor network having a variable resistance 55 and fixed resistance 56 and a condenser 57 connected in series for controlling the conduction of the unijunction 58 connected in series with the resistors 59 and 60.

The resistance capacitor network is connected through resistor 159 to the low voltage source 61 which charges condenser 57 until the appropriate voltage is reached to fire the unijunction 58. This applies a signal to the transistor 62 by means of the resistor 60. The transistor 62 is also connected to the low voltage source 61 through resistor 63. Condenser 64 is connected across the series combination of the transistor 62 and resistor 63. The line 52 is connected to the clock 18 between the resistor 63 and the transistor 62. The clock 18 provides a timed periodic pulse which shifts the flip-flop component 16 from one condition to the other, causing a pulse to be applied either to the silicon controlled rectifier 30 or to the silicon controlled rectifier 31.

The flip-flop component 16 has two transistors 130, 131 connected between ground and the opposite ends of the primary windings of the transformer 50. The common ends of the windings are connected to the low voltage source 61 through resistor 139 and are connected to ground through the capacitor 132. Resistance capacitance circuits 133, 134 cross couple the transistors 130, 131. Rectifiers 135, 136 and resistors 137, 138 are connected to component 16. The pulse applied through line 52 resets the flip-flop rendering the conducting transistor non-conductive and the non-conducting transistor conductive.

The flip-flop component 17 comprises transistors 170, 171 connected between ground and the opposite ends of the primary windings of the transformer 51. The common ends are connected to the low voltage source 61 through resistor 139a and are connected to ground through the condenser 172. The resistance capacitance circuits 173, 174 cross couple the transistors 170, 171. The actuating signals are applied through the rectifiers 79, 80 to alternately turn the transistor off.

Since the phase of the output of the inverter 11 is to be adjustable in relation to that of the inverter 10, the timing pulses applied to the flip-flop component 17 must be variable in relation to the timing pulses applied to the flip-flop component 16. A slave clock 21 provides a pulse to the flip-flop component 17 through the line 65 and the condensers 66, 67.

The slave clock has a resistor capacitor network connected to the low voltage source 73. The network comprises resistor 70, variable resistor 71 and capacitor 72 connected in series. A unijunction transistor 74 is connected between the resistor 71 and capacitor 72. The capacitor 72 on reaching a given voltage renders the unijunction 74 conductive so the current passes through the resistors 75, 76 connected in series with the unijunction transistor 74 to the low voltage source 73. A transistor 77 is connected in series with a resistor 78 to the low voltage source 73 and between the unijunction 74 and the resistor 76. The voltage across the resistor 76 renders the transistor 77 conductive to provide a pulse by means of the line 65 which is connected between the transistor 77 and the resistor 78. The rectifiers 79 and 80 connected to the capacitors 66 and 67 on the opposite side from the line 65 conduct the signal for application to the flip-flop component 17. The charge of the capacitor 72 is synchronized with the main clock 18 and the operation of the flip-flop component 16 by the application of a signal applied through the line 81 connected between the buffer flip-flop component 19 and the capacitor 72. The flip-flop component 19 is of a conventional type and is connected to the low voltage source 73. One half of the component is connected to the flip-flop component 16 by means of a lead 82 connected between the back-to-back uncontrolled rectifiers 83 and 84. These rectifiers are connected to a respective half of the flip-flop component 16 for projecting a signal onto the flip-flop 19 with a change in condition of the flip-flop component 16. The flip-flop component 19 correspondingly changes to commence the charging of the capacitor 72.

The flip-flop component 19 has two transistors 140, 141 and coupling resistance capacitance networks 142, 143 cross connected to hold one transistor non-conductive while the other is conductive. Transistor 140 is normally conductive to maintain capacitor 72 discharged through the rectifier 144 and line 81. The pulse from component 16 applied through line 82 shuts transistor 140 off and through resistor 145 and coupling network 142 turns transistor 141 on. Capacitor 72 charges to excite unijunction 74 and transistor 77. When a signal is applied to line 65, a reset signal is applied to transistor 141 through the coupling condenser 146 and rectifier 147. Resistor 146a is a discharge resistor. The rectifier 147 isolates the slave clock 21 from transient pulses arising in the operation of the flip-flop component 19. The transistor 141 is turned off and transistor 140 turned on to reset the component 19. Load resistors 148, 149 are in series respectively with transistors 140, 141. Diodes 150, 151 are protective devices to limit the voltage applied to the transistor.

The time constant of the resistor capacitor network of the slave clock is comparable to the time constant of the resistor capacitor network of the main clock 18, so that the time charging of the capacitor 72 is the same as that of the capacitor 57 and the inverter 11 will be rendered conductive in proper timed relation to inverter 10.

The charging of capacitor 57 that initiates a half cycle of the output of inverter 10 also starts the charging of capacitor 72 which initiates a half cycle of the output of inverter 11. This half cycle of inverter 11 is of opposite polarity to the half cycle of the output of inverter 10. Thus in this embodiment the output of inverter 11 leads the output of inverter 10, since it is the trailing edge of each half cycle of the output of inverter 11 and the leading edge of each half cycle of the inverter 10 which define the overlap of the outputs. Thus increasing the rate of charge of capacitor 72 will decrease the overlap and decreasing the rate of charge will increase the overlap.

The rate of charge of the capacitor 72 may also be controlled by the variable phasing circuit 22. This circuit has two transistors 85 and 86 connected in parallel between the capacitor 72 and low constant voltage source 73 with a resistor 87 connected in series therewith. When either of these transistors is rendered conductive, a resistance capacitor network is provided having a lower resistance than that provided by the resistors 70 and 71. This shortens the time constant for the charging of the capacitor 72 thus advancing the time when the unijunction 74 is fired and a signal is applied by the transistor 77 to the flip-flop 17. Thus an advance is imparted to the output of inverter 11 resulting in a lowering of the output voltage.

Transistor 85 is connected through the resistors 88 and 89 and the rectifier 90 to the voltage control circuit 25. This circuit comprises transformer 100 connected between the output 15 and the full wave rectifier bridge circuit 101 which applies a low voltage across a Zener diode 102 and resistors 103 and 104 connected in series therewith, and across series resistors 105, 106, 107 and 108 connected in parallel with Zener diode 102 and resistors 103 and 104. These resistors and Zener diode form a four-legged bridge network with the output of the rectifier 101 connected across one diagonal and the input to the transistor 85 connected across the other diagonal. The Zener diode 102 provides a basic voltage reference against which the low voltage supplied by the rectifier 101 is compared to produce a reference signal that is applied to the transistor 85.

The bridge network 109 provides a difference voltage which renders transistor 75 conductive imparting a slightly lower resistance to the charging circuit for the capacitor 72 advancing the application of the firing pulse to the inverter 11 and thereby shifting the phase of the output voltage. On a decrease of output voltage, the difference signal from the network 109 decreases. The time constant increases, the phase difference of the output voltage of the inverter decreases, increasing the voltage. Thus the voltage at the output 15 remains constant. Correspondingly, if there is an overvoltage, opposite correction is applied.

The resistors 70, 71 have a resistance value so that the inverter 11 will have an output leading 40° ahead of the output of inverter 10. This phase difference is for full-load low line conditions. As load conditions require, the phase difference is decreased or varied by the voltage control circuit 25. The operating range of the phase difference is 40° to 160°.

The flip-flop components 16 and 17 are interconnected by the resistors 155, 156 and rectifiers 79, 80 to set the sequence of operation of the components 16, 17. Since the output of inverter 11 always leads the output of inverter 10, the phase of component 17 leads that of component 16. However, by rearrangement of the elements coupling the flip-flop components 16 and 17 and the elements of the slave clock 21, the phase of the component 17 can lag that of the component 16. The rectifiers 157, 158 of component 16 and rectifiers 175 and 176 of component 17 are protective diodes to limit the voltage applied to the respective transistors.

In view of the sensitivity of silicon controlled rectifiers to excessive currents, current and voltage limiting components 23, 24 and 26 are provided. The overvoltage limiter 26 is connected across the output lines and comprises a full wave bridge network formed by the rectifiers 110 with one diagonal connected between the output lines, and capacitors 111 and resistors 112 connected across the other diagonal to absorb or shunt the excessive currents on removal of a load. This reduces the overload for a few half cycles. For a more sustained protection, the current limiting component 23 and voltage limiting component 24 are provided.

The current limiting component 23 has a transformer 115 with a primary winding 115p in one of the output lines. The secondary winding 115s is connected across the diagonal of the full wave bridge network 116. The series connected resistors 117 and 118 are connected across the output. Also connected across the output is the Zener diode 119, resistor 120 and the input of the transistor 86. When the voltage of the bridge network exceeds a given value due to excessive currents, the Zener diode becomes conductive and the transistor 86 conducts, increasing the phase difference between the outputs of the inverters 10 and 11 to maintain the output current at a given maximum value, larger than the normal current but less than the values destructive to the silicon controlled rectifiers.

The voltage limiting component 24 is provided to limit the output voltage when the output of the inverter apparatus is subjected to a short or overload at the time that it is turned on. The transformer 120 has the primary winding 120p connected across the output 15. The secondary winding 120s is connected to a half wave rectifier 121 and Zener diode 122. On the occurrence of an excessive voltage, Zener diode 122 conducts applying a voltage to the input of the transistor 86 to increase the phase difference between the outputs of the inverters 10 and 11. Thus the output current is limited to a maximum value below the destructive values of the silicon controlled rectifiers, as illustrated in FIG. 5.

In the foregoing description the outputs of the inverters 10 and 11 are referred to as being of a square wave shape. This is in reference to the voltage produced by the inverter. The output current of the transformers 32 and 42 will vary continuously throughout each half cycle. The output current is modified by the reactor 13 and the condenser 27 which forms a tuned circuit to eliminate even harmonics and smooth it into a sinusoidal form by the filter 14.

The resistor capacitor networks 123, 124, 125 and 126 connected in parallel to the silicon controlled rectifiers 30, 31, 40 and 41 provide a shunt circuit for passing transient voltages and currents around the rectifiers to avoid the firing of the rectifiers by transient conditions.

In the inverters the resistors 161 and rectifier 162 are connected across the inductor 36 as a protective circuit to prevent sparking. The condenser 163 connected in shunt is of the electrolytic type to filter out parasitic alternating current. Similarly, the networks 164 to 167 comprising a rectifier and a capacitor and resistor connected in parallel therewith, and the capacitors 168 and 169 also take care of transient currents to prevent inadvertent firing of a silicon controlled rectifier when it is in the off condition.

It is seen from the foregoing that a static inverter has been attained which can convert power from a direct current source, such as a battery, to alternating machinery, such as an electric motor, and provide a sine wave output current and an output voltage having constant values over a range of output currents. The system due to its non-rotative parts has a high system efficiency permitting a long operating time from a battery source of power. Also, the inverter has improved efficiency and greater operating life due to the reduction of the number of relay contacts normally utilized in rotating inverters. The inverter may be used to drive various types of alternating machinery, such as lifter trucks, tractors and the like.

I claim:

1. A static inverter for converting direct current to alternating current comprising first and second inverter components, each component having two gate means for alternately passing current and having output transformer means with the outputs thereof connected in series additive relation, first and second flip-flop components respectively coupled to said gating means to alternately fire said gating means of a respective inverter, first and second timing means connected to the respective first and second flip-flop components for actuating said components at timed intervals, a buffer flip-flop component connected between said first flip-flop component and said second timing means to set said second timing means on said first flip-flop component being actuated by said first timing means for actuating said second flip-flop component to fire said second gating means in timed relation with said first gating means.

2. A static inverter as set forth in claim 1 wherein a variable delay circuit is connected to said second timing means for shortening the interval of time between the actuation of said gating means and a voltage control circuit is connected between the output of the static inverter and the variable delay circuit to decrease the time interval between the actuation of said gating means and the phase relationship between the outputs of said transformer means in order to maintain the output of the static inverter at a desired voltage.

3. A static inverter as set forth in claim 1 wherein a variable delay circuit is connected to said second timing means for shortening the interval of time between the actuation of said gating means and a current limiting component connected between the output of the inverter and said variable delay circuit to increase the time interval between the actuation of said gating means in order to reduce the output on the occurrence of excessive overloads.

4. A static inverter as set forth in claim 1 wherein a variable delay circuit is connected to said second timing means for increasing the interval of time between the actuation of said gating means and increasing the phase relationship between the outputs of said transformer means in order to maintain the output of the static inverter at a desired voltage.

5. A static inverter as set forth in claim 1 wherein connecting means are provided between said second timing means and said buffer flip-flop component to reset said buffer flip-flop component on actuation of said second flip-flop component by said second timing means.

6. A static inverter for converting direct current to alternating current comprising first and second inverter components; each inverter component having an output transformer with a split primary winding and an output secondary winding, a pair of silicon controlled rectifiers connected to the opposite ends of said primary windings, means for interconnecting an intermediate point of said windings to ground, an inductance in series with said rectifiers and a capacitor connected across said primary winding to terminate the conduction of one rectifier on the initiation of current through the other rectifier; first and second flip-flop components having two stable states and coupled respectively to the rectifiers of said first and second inverter components for alternately firing said rectifiers on the change from one stable condition to the other; and clock means connected to said first flip-flop component for impressing precisely timed pulses on said first flip-flop component to change it from one stable condition to the other, a slave clock connected to said second flip-flop component to impress second timed pulses on said second flip-flop component; a buffer flip-flop component connected between said first flip-flop component and said slave clock for initiating said slave clock for the creation of timed pulses applied to said second flip-flop component at an interval of time different from the timed pulses on said first flip-flop component so that the voltage in the output winding of said second transformer is leading the voltage in the output of said first transformer for controlling the output voltage of the static inverter.

References Cited

UNITED STATES PATENTS

| | | | |
|---|---|---|---|
| 3,010,062 | 11/1961 | Van Emden | 321—45 XR |
| 3,189,813 | 6/1965 | Frierdich | 321—45 |
| 3,205,424 | 9/1965 | Bates | 321—18 |
| 3,247,447 | 4/1966 | Flairty | 321—14 |
| 3,248,635 | 4/1966 | Corey | 321—45 XR |
| 3,297,936 | 1/1967 | Ruch | 321—18 |
| 3,309,600 | 3/1967 | Wellford | 321—5 XR |
| 3,311,807 | 3/1967 | Rodaer | 321—45 XR |

JOHN F. COUCH, *Primary Examiner.*

WARREN, E. RAY, *Examiner.*

W. M. SHOOP, JR., *Assistant Examiner.*